Jan. 3, 1967 | B. F. SCHLAGECK | 3,295,539
FILTER CLEANER
Filed Jan. 8, 1965 | 2 Sheets-Sheet 1
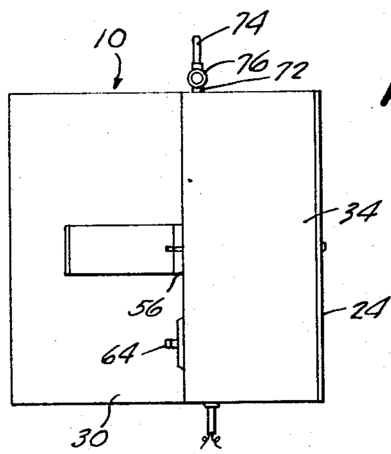
FIG. 1.
FIG. 2.
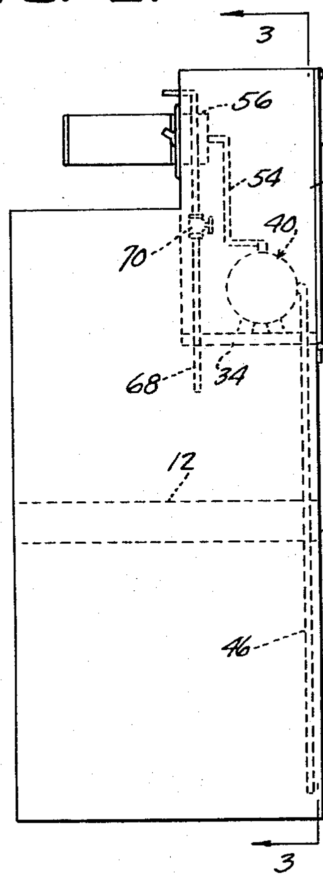
FIG. 3.
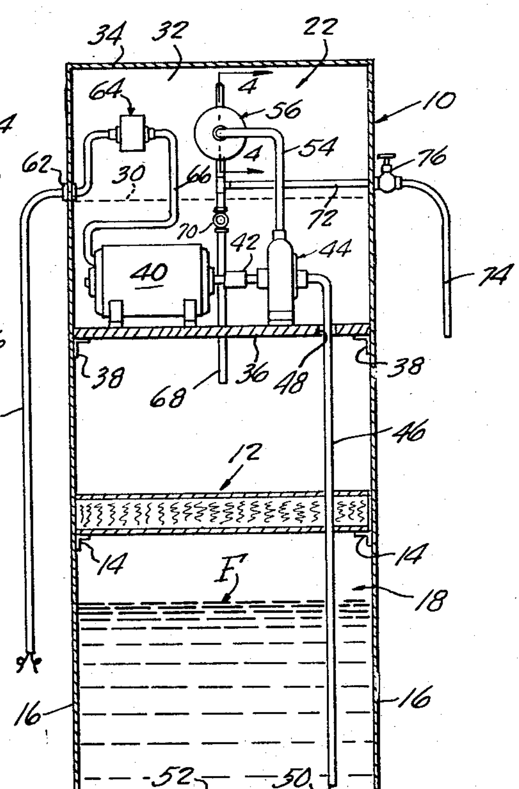
INVENTOR.
BERNARD F. SCHLAGECK,
BY
Berman, Davidson & Berman
ATTORNEYS.

Jan. 3, 1967 B. F. SCHLAGECK 3,295,539
FILTER CLEANER
Filed Jan. 8, 1965 2 Sheets-Sheet 2
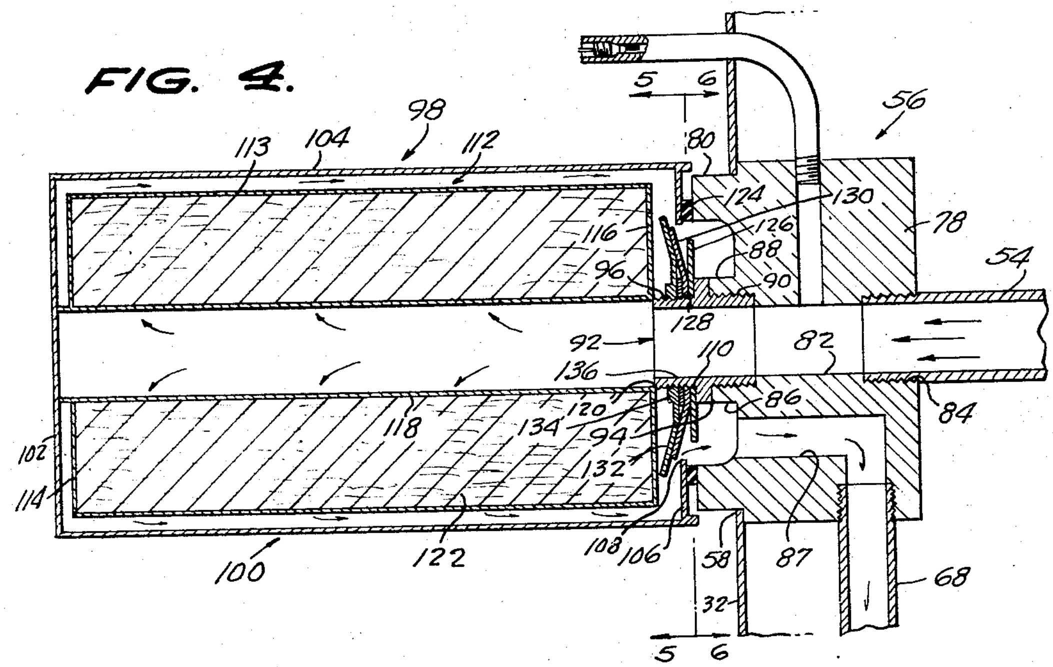
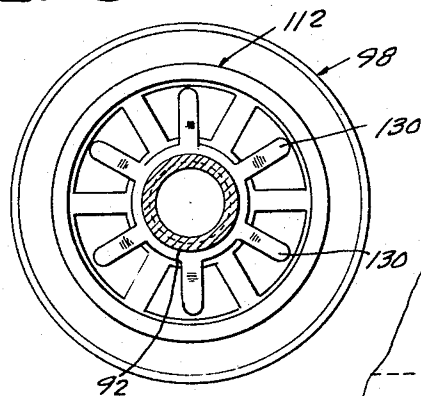
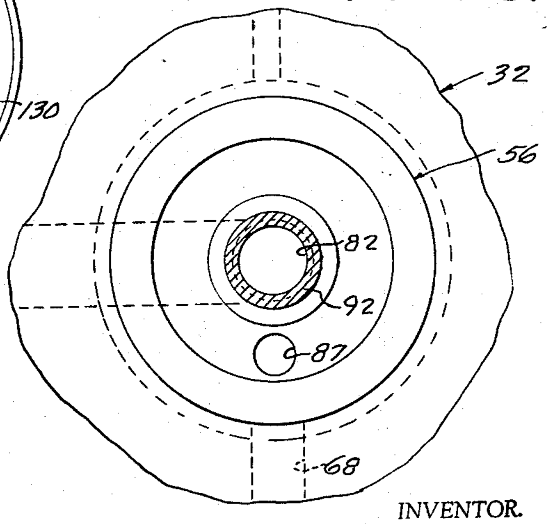
INVENTOR.
BERNARD F. SCHLAGECK,
BY
Berman, Davidson & Berman
ATTORNEYS.

United States Patent Office 3,295,539

Patented Jan. 3, 1967

3,295,539

FILTER CLEANER

Bernard F. Schlageck, 603 S. Broder, Anaheim, Calif. 92804

Filed Jan. 8, 1965, Ser. No. 424,397
1 Claim. (Cl. 134—111)

This invention relates to a cleaner for filters, such as automotive filters, to enable their reuse after having become clogged in service.

The primary object of the invention is the provision of a practical, economical, and efficient cleaner of the kind indicated, through whose use, filter users, particularly large-scale users of filters, are enabled to save the expense of replacement of filters clogged in service.

Another object of the invention is the provision of a cleaner of the character indicated above, which utilizes circulation of cleaning fluid, under pressure, countercurrent to the usual direction of flow of oil in a filter, when in service, for diluting and removing sludge and dirt clogging the filter, and which involves changeable adapters for the connection to the cleaners of different forms and makes of filters.

A further object of the invention is the provision in a cleaner of the character indicated above, of an arrangement whereby cleaning fluid initially forced through a clogged filter, and, therefore, heavily burdened with dirt and sludge, can be diverted from the cleaning fluid container, so as to avoid contamination of the cleaning fluid in the container, and cleaning fluid can be circulated, through a partially cleaned filter, and returned, for reuse, through filtering means, into the container.

In the drawings:

FIGURE 1 is a top plan view of a cleaner of the present invention;

FIGURE 2 is a side elevation thereof;

FIGURE 3 is a vertical transverse section taken on the line 3—3 of FIGURE 2;

FIGURE 4 is an enlarged fragmentary vertical section taken on the line 4—4 of FIGURE 3; and FIGURES 5 and 6 are vertical transverse sections taken on the lines 5—5 and 6—6, respectively, of FIGURE 4.

Referring in detail to the drawings, the illustrated cleaner comprises a preferably vertically elongated, rectangular closed housing 10, provided, at its midheight level, with a horizontal filter assembly 12, resting upon brackets 14, on the side walls 16 of the housing. The space within the housing 10, below the filter assembly 12, containing nylon or cotton, constitutes a cleaning fluid chamber 18, in which cleaning fluid F rises to a level below the filter assembly.

The housing side walls 16 are extended upwardly, as indicated at 20, at the rear of the housing, to define a pump chamber 22, whose back is open, and is adapted to be closed by a door 24, hinged, as indicated at 26, at its lower end, to the upper end of the back wall 28 of the housing. A partial top wall 30, closes the upper end of the housing 10, and reaches to an abbreviated front wall 32 for the chamber 22. The chamber 22 has a top wall 34, and is closed, at its lower end, by a removable bottom wall 36, which rests upon brackets 38 on the housing side walls 16, at a level spaced above its filter assembly 12.

An electric motor 40 is mounted on the chamber bottom wall 36, which is operatively connected, as indicated at 42, to a pump 44, mounted on the bottom wall 36. The pump 44 has a cleaning fluid intake pipe 46 connected thereto and extending down, through an opening 48, in the chamber bottom wall 36, through the filter assembly 12, and has its open lower end 50, located near the bottom wall 52 of the cleaning fluid chamber 18.

A discharge pipe 54 leads from the pump 44 to a filter mounting head 56, which is mounted through an opening

58, formed in the front wall 32 of the chamber 22. A service cable 60 leads through a grommet 62 in a side wall of the housing to a switch 64, mounted through the front wall 32, the switch being connected, as indicated at 66, to the motor 40.

A cleaning fluid return pipe 68 leads downwardly from the filter mounting head 56, through the chamber bottom wall 36, into the housing, above the filter assembly 12. A hand valve 70 is provided in the pipe 68, at a point between its ends, which when open, provides for the return of cleaning fluid from the head 56, into the cleaning fluid chamber 18, after passing through the filter assembly 12. A bypass pipe 72 leads from the return pipe 68, at a point above the valve 70, through a side wall of the housing, and connects with a disposal hose 74, which leads to a point of disposal for sludge and dirt-laden cleaning fluid, such as results from an initial circulation of cleaning fluid through the head 56. A hand valve 76 is incorporated in the bypass pipe 72, which is adapted to be closed when the valve 70 is closed.

With this arrangement, relatively clean cleaning fluid, after circulation through the head in a filter-cleaning operation, can be automatically retrieved and returned to the cleaning fluid container 18, for reuse, whereas sludge-laden cleaning fluid, which would contaminate the cleaning fluid, in the chamber 18, can be thrown off.

The filter mounting head 56, as shown in FIGURE 4, comprises a block 78 of noncorrosive material, which has a reduced diameter forward portion 80, which is received through the opening 58 in the pump chamber front wall 32. The block 78 is formed with an axial horizontal bore 82 into which the cleaning fluid discharge pipe 54 is threaded, as indicated at 84.

The forward end of the block 78 is formed with a concentric annular groove 86, which defines a relatively small diameter hollow boss 88, into which is threaded, as indicated at 90, a tubular adapter 92. The adapter 92 has a lateral annular stop flange 94, spaced between its ends, which is adapted to abut the outer end of the boss, and the forward part of the adapter 92 is externally threaded, as indicated at 96.

An oil filter 98, to be cleaned, comprises a cylindrical can 100 having a bottom wall 102, a sidewall 104, and a top wall 106, the last being formed with a series of openings 108, and with a central opening 110. The can 100 supports in concentrically spaced relation to its sidewall 104, a cylindrical filter cartridge 112, which has a bottom wall 114 spaced from the can bottom wall 102, a sidewall 113 spaced from the can sidewall, and a top wall 116 which is spaced from the can top wall 106. A central tube 118 disposed axially within the cartridge 112, is secured, at its bottom end, to the can bottom wall 102, and at its top end, opens through the cartridge top wall 116, as indicated at 120. The interior of the cartridge between its walls and the tube 118 is filled with filtering material 122.

In accordance with the present invention, and for more efficient cleaning of the cartridge 112, the cartridge is disposed in a horizontal position, with its top wall engaged with an annular gasket 124 which abuts the related end of the head 56, and with the open top end of its tube registered with the adjacent end of the adapter 92. A washer 126 is circumposed on the outer part of the adapter, against the adapter flange 94, and a pressure disc 128 is threaded on the same part, against the washer 126.

The pressure disc 128 has circumferentially spaced, radial, and outwardly angled fingers 130, which are adapted to press against, and maintain open, segmental flap valves 132 on a nut 134, which is threaded on the adapter 92, and is a part of the cartridge 112, so as to provide for reverse flow of cleaning fluid, as indicated by arrows in FIGURE 4, from the space, in the can 98, around the cartridge 112, through the openings 108 around the groove 86 of the head 56, and into the pipe 68, through the head bore 87, while cleaning fluid, under pressure, flows outwardly through the tube 118, and through the filtering material 122, and the cartridge sidewall 113.

A small diameter gasket 136 is interposed between the pressure disc 128, and the nut 134.

What is claimed is:

A filter cleaner comprising a housing formed with a cleaning fluid chamber, a pump having an intake pipe leading from said cleaning fluid chamber, said pump having a discharge pipe, a filter mounting head being formed with an axial bore with which the discharge pipe is in communication, said head being formed with an offset bore, a fluid return pipe connected to said offset bore and leading to said cleaning fluid chamber, a bypass pipe connected at one end to said return pipe and leading outside of the housing, a first valve in said return pipe beyond the bypass pipe connection therewith and remote from the head, a second valve in the portion of the bypass pipe outside of the housing, said housing containing a filter assembly above and extending across the cleaning fluid chamber into which the return pipe discharges, and a tubular adapter threaded into said axial bore and extending forwardly from said head, the forward end of said head being formed with an annular groove concentric with the adapter and communicating with said offset bore, whereby a fluid filter may be secured to the head with its tube in communication with said axial bore only and its filter element in communication only with said offset bore.

References Cited by the Examiner

UNITED STATES PATENTS

| | | | |
|---|---|---|---|
| 2,615,456 | 10/1952 | Galusha | 134—111 X |
| 2,677,381 | 5/1954 | Fisher | 134—111 X |
| 3,044,475 | 7/1962 | Thompson | 134—102 |

CHARLES A. WILLMUTH, *Primary Examiner.*

R. L. BLEUTGE, *Assistant Examiner.*